May 14, 1968 E. W. BROCK 3,383,552
AUTOMATIC HEADLIGHT DIMMING SYSTEM WITH TIME DELAY IN SWITCHING FROM HIGH TO LOW BEAM
Filed Feb. 23, 1967
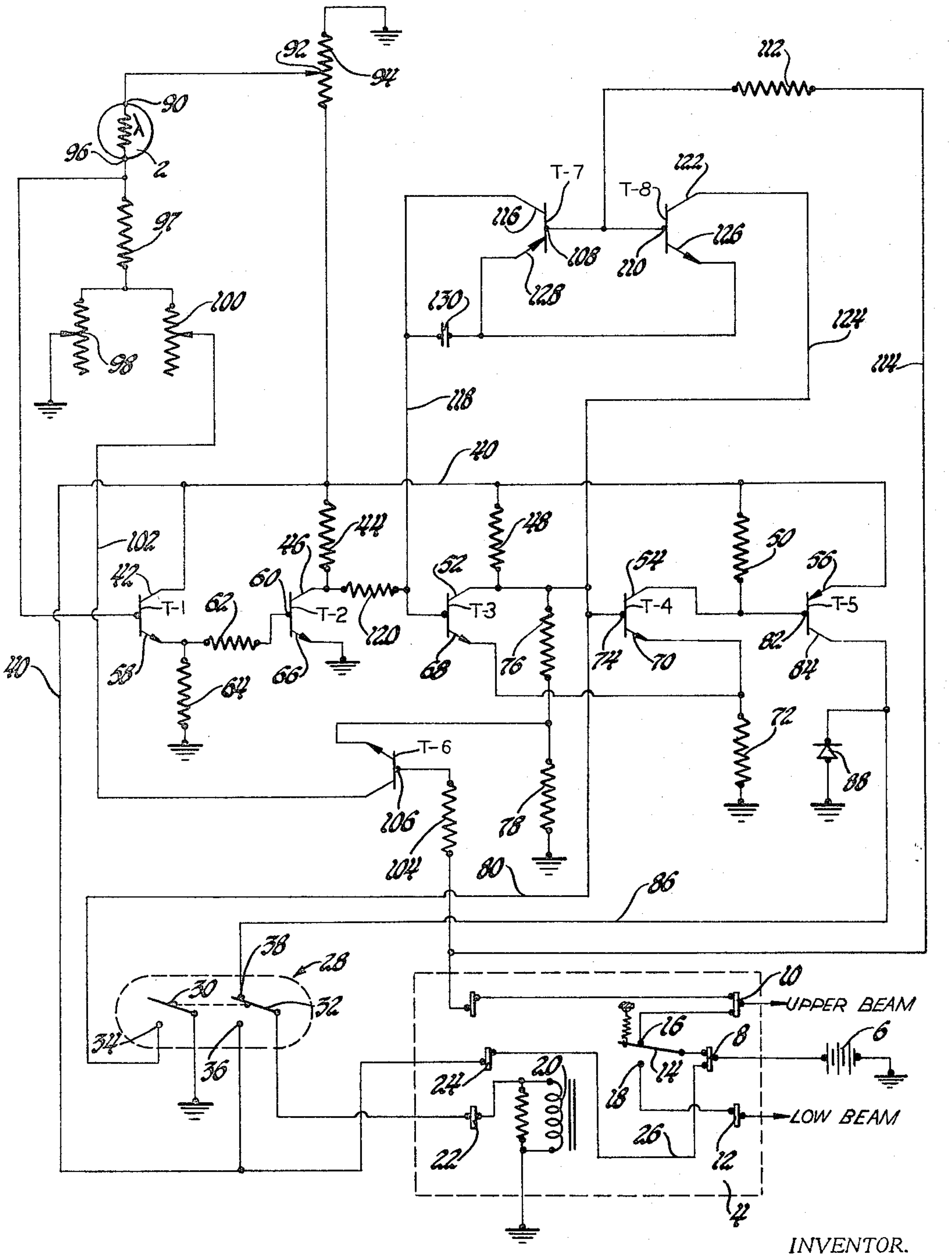
INVENTOR.
Eugene W. Brock
BY Robert E. Fowler
ATTORNEY United States Patent Office 3,383,552

Patented May 14, 1968

3,383,552

AUTOMATIC HEADLIGHT DIMMING SYSTEM WITH TIME DELAY IN SWITCHING FROM HIGH TO LOW BEAM

Eugene W. Brock, Anderson, Ind., assignor to General Motors Corporation, Detroit, Mich., a corporation of Delaware Filed Feb. 23, 1967, Ser. No. 617,917

5 Claims. (Cl. 315—83)

ABSTRACT OF THE DISCLOSURE

A one way time delay circuit to prevent an automatic headlight dimmer system from switching from high beam to low beam energization upon receipt by the pick-up of short flashes of bright light.

*Description of the preferred embodiment*

The light sensitive pick-up units for automatic headlight dimming systems have usually been mounted behind the windshield and have been shielded by the body. When the pick-up is mounted outside the main body, such as in the front grille, the pick-up unit is more subject to short sporadic flashes of high intensity light which tend to trigger the system and switch from high beam to low beam but, of course, this incident light does not persist and the system would then quickly switch back to high beam causing an annoying flashing of headlights to the driver of the car and to oncoming drivers who may believe that they are being given a signal. While previous systems, such as that shown in copending application Ser. No. 533,727, entitled, Solid State Crystal Automatic Headlight Dimming System, filed Mar. 11, 1966, Eugene W. Brock, et al., operate satisfactorily with the pick-up within the vehicle, a time delay circuit will eliminate the cycling of lights on the receipt of short flashes of incident light.

Time delay circuits to prevent the automatic headlamp dimmer system from switching from high beam to low beam on flashes of bright light are basically not new as shown in McIlvaine, 2,907,920. However, the whole dimmer system of McIlvaine is entirely different as well as the time delay section so the present system specifically differs therefrom. Keeran, 3,177,397 also discloses an automatic headlight dimmer system which incorporates a time delay feature but this is to provide a delay in return from low beam to high beam which is the exact opposite action as the current system has no delay in return to high beam. The present disclosure relates to a completely solid state, transistorized automatic headlamp dimmer system with a delay to prevent switching from high beam to low beam energization of desired period of time to avoid unwanted cycling of the system on flashes of incident light.

The single figure of the drawings shows a circuit diagram of a solid state light sensitive automatic headlight dimmer system embodying my invention.

Basically, the light sensitive control system includes a light sensitive cell 2 which may be a solid state crystal material. This cell is connected to a control circuit consisting of a pluraility of transistor stages T–1, T–2, T–3, T–4, T–5, and T–6 whose combined effect controls the power relay 4 to switch between upper and lower beam energization. The novel time delay feature incorporated in the present system is provided by that circuit portion including transistors T–7 and T–8. This introduces a fixed time delay in switching from high to low beam but no delay in returning to high beam energization as will be described.

The automatic dimming system is supplied with power from a source such as battery 6 connected to terminal 8 of the power relay 4. The upper beam filaments of the headlamps are connected to terminal 10 of the relay and the lower beam filaments to terminal 12. Armature 14 is spring biased into engagement with stationary contact 16 directly connected to terminal 10. When the power relay is deenergized the high beam filaments are energized. Armature 14 may move to engage spaced contact 18 which is connected to the lower beam filaments. The relay coil 20 has one lead grounded and the second connected to terminal 22. Terminals 24 and 8 of the power relay 4 are internally connected by line 26.

The manual control and override switch 28 is an overcenter type which remains in the last position to which it was actuated. Both movable armatures 30 and 32 move simultaneously as indicated by the dashed interconnecting line. This may be a foot actuated switch if desired. Armature 30 is grounded and in its lower position engages contact 34. In its upper position it is free. Armature 32 moves between lower contact 36 and upper contact 38. Contact 36 is connected to line 40 which is the main power line of the system and extends from terminal 24 of the power relay to various points in the system. It is connected to collector 42 of transistor T–1, through bias resistor 44 to collector 46 of transistor T–2, through similar bias resistors 48 and 50 to collectors 52 and 54, respectively, of transistors T–3 and T–4 and to emitter electrode 56 of transistor T–5.

Emitter 58 of transistor T–1 is coupled to base 60 of transistor T–2 through resistor 62 and to ground through bias resistor 64. The emitter 66 of transistor T–2 is grounded. Emitters 68 and 70 of transistors T–3 and T–4 are directly connected together and to ground through bias resistor 72. Collector 52 of transistor T–3 is directly connected to base 74 of transistor T–4 and resistors 76 and 78 in series form a voltage divider between the line connecting line and ground. Base 74 of T–4 is also connected to line 80 which extends to stationary contact 34 in foot switch 28. Collector 54 of transistor T–4 is connected to base 82 of transistor T–5 and collector 84 of T–5 through line 86 to contact 38 on foot switch 28. Diode 88 is connected between line 86 and ground.

The light sensitive control element or cell 2 is of the solid state type whose resistivity changes with change in light ambient intensity and has one contact 90 connected to an adjustable contact 92 on rheostat 94, one terminal of which is grounded and the other connected to power line 40 to provide voltage to the cell. Rheostat 94 acts as the sensitivity control for the light cell system. The remaining contact 96 of the cell 2 is connected through a first circuit to ground through resistor 97 and variable resistor 98 in series. Variable resistor 98 acts as the "hold control" or that value of light at which the system switches back to high beam illumination from low beam. An alternate circuit from the lower end of resistor 97 to ground is through variable resistance 100, line 102, transistor T–6 to ground. The base 106 of transistor T–6 is grounded through the upper beam filaments or connected to the battery 6 through series resistor 104. Variable resistor 100 is the "dim control" or adjustment to the point of light intensity at which the headlights switch from upper to lower beam.

The operation of the control system described to this point is as follows. Assume that the proper connections have been made to the source of electric power, upper and lower beam filaments and the switch 28 is in automatic position as shown and a low level of light is incident on cell 2. Under these conditions the resistivity of the cell 2 is high and the bias on the base T–1 causes that transistor to be cut off. With transistor T–1 non-conductive the voltage on base 60 of transistor T–2 is low and that transistor is also cut off. Transistor T–3 which forms a part of a multivibrator circuit with T–4 has a sufficiently high load bias to be conductive, and therefore, holds transistor T–4 off. Transistors T–1 through T–4 are all NPN type but T–5 is a PNP. With T–4 cut off voltage on base 82 of T–5 is high which cuts this transistor off. Since this is the control circuit for power relay coil 20, that remains deenergized, and the spring bias holds armature 14 in its upper position as shown. The high beam filaments are energized.

Upon approach of a vehicle from the opposite direction which introduces light to the cell 2, the resistance of the cell is reduced to increase the voltage on the base of T–1 to turn it on. This in turn raises the voltage on base 60 of T–2 causing it also to conduct. When this occurs the voltage on the base of T–3 is reduced to turn it off causing a regenerative trigger action to turn T–4 on. With T–4 on, the base 82 of T–5 is driven down to turn it on and complete an obvious energizing circuit to relay coil 20. Energization of that coil pulls armature 14 down, disconnecting the high beam filaments, and connecting the low beam ones. Removal of the incident light causes switching back to high beam. Diode 88 between line 86 and ground provides a break down back voltage path to ground for voltage generated by the collapsing field of coil 20 to protect the transistor T–5.

Transistor T–6 is the grounding circuit for the dim control rheostat 100. When the car and light cell 2 are in a dark area and the upper beam filaments are on, the base 106 of T–6 is at approximately 12 volts and with the voltage on the emitter at about +.15 volts. Under these conditions transistor T–6 conducts and forms a path to ground through the dim control 100. When the relay switches to low beam position the 12 volt supply is removed from the base 106 which is now connected to ground, thus cutting off flow through T–6 and breaking the ground connection. Under illuminated or low beam energization condition, the only biasing path to ground for contact 96 of cell 2 is, therefore, through the hold control 98 which determines the light value at which the system will switch back to high beam. The rheostat 92–94 is the sensitivity control for the system and is driver operated. It controls the amount of voltage on the cell 2.

This portion of the system is described in the co-pending application Ser. No. 533,727, Brock, et al., previously referred to but is necessary for a full understanding of the present improvement. Short flashes of high intensity light might and sometimes do cause the circuit described to switch from high beam to low. Since they are of short duration there is no continuing light impinging on the photocell to keep the lights on low beam so they then return to high beam causing annoying flashing of the car lights. In order to provide a definite time delay on switching from high beam to low beam but still switch back to high beam as soon as the approaching vehicle has passed that circuitry associated with transistors T–7 and T–8 is employed.

The bases 108 of transistor T–7 and 110 of the transistor T–8 are directly connected together and the line connecting them is coupled through resistor 112 and line 114 to terminal 10 of the power relay which is that feeding the upper beam filament and also the one which is energized during energization of the upper beams directly by the battery 6. The collector 116 of transistor T–7 is connected through line 118 to the base of transistor T–3 which itself is interconnected with the collector 46 of T–2 through biasing resistor 120. In a similar manner collector 122 of transistor T–8 is connected through line 124 to base 74 of transistor T–4 and to collector 52 of transistor T–3 which are the two transistors which form the multivibrator trigger circuit. The two emitters 126 and 128 of transistors T–8 and T–7, respectively, are connected directly together and through a capacitor 130 with line 118. It is to be noted that the two transistors T–7 and T–8 are of the opposite types, T–7 being a PNP and T–8 being an NPN. The additional elements actually added to the basic control system consist in the two transistors T–7 and T–8, resistor 112 and capacitor 130.

With the full system and the photocell 2 in the dark condition and the upper beams illuminated, T–7 is normally in the non-conducting or off condition. T–8 is conducting or in the on condition since the base is at a higher potential and it has the opposite characteristics than T–7. Line 114 is approximately the voltage of the battery and line 118 approximately +2.5 and line 124 is approximately 2 volts. This, therefore, charges the condenser 130. If, under these conditions, photocell 2 is suddenly exposed to light of the dimming level, transistor T–2 which has been off is turned on and this drives its collector 46 towards ground potential or zero. This would tend to cut off T–3 which has been conducting were it not for the action of the time delay circuit including capacitor 130. Capacitor 130 is connected between the base of T–3 by line 118 through transistor T–8 and line 124 to the collector of T–3. Due to the charge on the capacitor the base of T–3 is held above ground for approximately 1.0 second. This is the time required for the capacitor 130 to discharge through the resistor 120 to ground. As the base of T–3 approaches ground, T–3 is suddenly turned off and its collector rises from +2.0 volts to +5.0 volts. This, therefore, also applies to the base 74 of T–4, and T–4 immediately turns on. This provides a time delay of approximately one second and the total system will not turn on unitl one second after the light level has risen and T–2 has been turned on.

Following the previously described sequence of operation when T–4 turns on, T–5 turns on which energizes the power relay 4 and the light switch 14 from upper to lower beam. This removes the power voltage from source 6, namely 12 volts from line 114 which now goes to ground potential through the upper beam filament. With base 110 of T–8 at ground potential T–8 will turn off and at the same time T–7 will turn on. Since the emitter 128 and collector 116 of T–7 shunt capacitor 88, this will cause the capacitor 130 to discharge completely through T–7 and remove all charge from said capacitor. With T–8 turned off, capacitor 130 is not now connected to the collector of T–3.

When the incident light is removed from the photocell 2 or the approaching vehicle passes, transistor T–3 will again be turned on under the operation described previously. However, since capacitor 130 is not connected between its base and the collector of T–3, the voltage will immediately shift from +5 volts to +2 volts. This will turn off T–4 and in sequence T–5 to in turn switch the power relay coil and the light switch back from low beam to upper beam. There is, therefore, no delay in switching back from low to high beam. This again applies approximately 12 volts to line 114, transistor T–7 is turned off, and T–8 is turned on as previously described. This removes the short from condenser 130 and it recharges to provide a delay cycle for the next time cycle.

In this manner a one second time delay is introduced between switching from high to low beam but the circuitry for providing the same is made ineffective in switching back to high beam. It should be noted that the time delay is effective only when the photocell is exposed to flashes of light and will introduce no change in the operation when the photocell is gradually exposed to light as the condenser 130 will discharge and it would operate in the normal manner originally described.

What is claimed is:

1. In an automotive vehicle having a source of electrical energy, multibeam headlamps and relay switching means connected in circuit therewith to supply electrical energy alternately to cause one set of beams to be energized or the other, the improvement which comprises automatic control means for the relay switching means including a light sensitive element mounted on the vehicle in a position to receive incident light projected on the front from approaching vehicles, a multistage amplifier having an input and an output circuit, said input circuit being connected to the light sensitive element to amplify signals therefrom, said output circuit being connected to said relay switching means so that the amount of light falling on the light sensitive means will control the relay switching means and which set of beams are energized, and transistorized time delay means connected to the multistage amplifier and to the source of electrical energy to introduce a predetermined time delay period in the operation of the relay switching means when incident light falls on the light sensitive element but not to interfere in any way with switchng back to the opposite beam position whenthe incident light is removed to prevent operation of the automatic control means upon short flashes of light.

2. Automatic light sensitive control means for relay switching means as defined in claim 1 in which the transistorized time delay means includes a condenser and means for charging the condenser during periods of no or little illumination on the light sensitive element to introduce a time delay for condenser discharge and operation of the relay switching means upon reception of incident light to prevent operation of the same on short light flashes.

3. Automatic light sensitive control means for relay switching means as defined in claim 1 in which the transistorized time delay means includes a condenser and means for charging the condenser during periods of no or little illumination on the light sensitive lement to introduce a time delay for operation of the relay switching means upon reception of incident light to prevent operation of the same on short bright flashes.

4. Automatic light sensitive control means for relay switching means as defined in claim 1 in which the transistorized time delay means includes a circuit of two transistors connected to a condenser, one providing a charging circuit and the other a discharging circuit for said condenser, said transistor being connected in circuit to be alternately conductive to provide a charging of the condenser when the light sensitive cell has no incident light falling thereon and the amplifier is in one condition and the other to be conductive and the first biased off when light falls on the light sensitive cell and the amplifier in a second condition to provide delay in relay switch operation in one direction only.

5. In an automotive vehicle having a source of electrical energy, multibeam headlamps and relay switching means connected in circuit therewith to supply electrical energy thereto and alternately cause either one set of beams or the other to be energized, the improvement which comprises automatic control means for the switching means including a solid state light sensitive element mounted on the vehicle in a position to receive incident light projected on the front of the vehicle, a multistage solid state amplifier having an input and an output circuit, said input circuit being connected to the light sensitive element to amplify the signals therefrom, a multivibrator connected to the output circuit of the amplifier and triggered by the same, a transistor having an input and an output circuit, said transistor input circuit being connected to the multivibrator output circuit and said relay switching means in said transistor output circuit so that the amount of light falling on the solid state light sensitive element will determine which set of beams is energized through the multistage solid state amplifier and multivibrator control sections, and transistorized time delay means connected to the multistage amplifier and multivibrator and to the source of electrical energy to introduce a predetermined time delay period in the operation of the relay switching means when incident light falls on the light sensitive element but not to interfere in any way with relay switching means in moving back to the opposite beam position when the incident light is removed to prevent operation of the automatic control means upon short flashes of light.

References Cited

UNITED STATES PATENTS

| | | | |
|---|---|---|---|
| 2,872,618 | 2/1959 | Matkins | 315—83 |
| 2,884,564 | 4/1959 | McIlvaine | 315—83 |
| 2,935,646 | 5/1960 | Matkins | 315—83 |
| 3,319,116 | 5/1967 | Schick | 315—83 |

JAMES W. LAWRENCE, *Primary Examiner.*

C. R. CAMPBELL, *Assistant Examiner.*